United States Patent [19]
Nakai et al.

[11] Patent Number: 5,316,825
[45] Date of Patent: May 31, 1994

[54] ANTI-FOGGING FILM MADE OF A TRANSPARENT SYNTHETIC RESIN

[75] Inventors: Takeyuki Nakai; Kazuyoshi Murakami; Yoshiko Ito, all of Nagoya, Japan

[73] Assignee: Mitsubishi Kasei Vinyl Company, Tokyo, Japan

[21] Appl. No.: 900,466

[22] Filed: Jun. 18, 1992

[30] Foreign Application Priority Data

Jun. 19, 1991 [JP] Japan .................................. 3-147574
Nov. 5, 1991 [JP] Japan .................................. 3-288843

[51] Int. Cl.$^5$ ................................................ B32B 3/00
[52] U.S. Cl. .................................... 428/156; 428/141; 428/167; 428/213; 428/215; 428/220
[58] Field of Search ............... 428/156, 167, 141, 188, 428/212, 213, 215, 220, 337, 480, 500; 4/15

[56] References Cited

U.S. PATENT DOCUMENTS 3,832,267  8/1974  Liu .................................... 428/167
4,380,564  4/1983  Cancio et al. ...................... 428/167

Primary Examiner—Donald J. Loney
Attorney, Agent, or Firm—Oblon, Spivak, McClelland, Maier & Neustadt

[57] ABSTRACT

An anti-fogging film consisting essentially of a thin film of a transparent synthetic resin, which has micro concavities of at most 20 μm in width and at most 10 μm in depth formed over the entire surface of at least one side of the thin film, the total area of the micro concavities being from 20 to 80% of the area of the film surface on which the concavities are formed.

9 Claims, 1 Drawing Sheet

ANTI-FOGGING FILM MADE OF A TRANSPARENT SYNTHETIC RESIN

BACKGROUND OF THE INVENTION

1. Field of the Invention

The present invention relates to an anti-fogging film made of a transparent synthetic resin. More particularly, it relates to an anti-fogging film made of a synthetic resin which is effective to prevent formation of misty water droplets in the vicinity of its surface and to prevent fogging due to deposition of water droplets formed by condensation of moisture on its surface. Further, the present invention relates to an anti-fogging film suitable as a cover for e.g. a green house or tunnel.

2. Discussion of Background

Heretofore, synthetic resin films excellent in heat insulating properties and weathering resistance have been widely used as covering materials for green houses, tunnels, etc. Such synthetic resin films are advantageous in that as compared with glass plates, they are light in weight and inexpensive. In these fields of application, it is important that the covering materials have a high light transmittance and excellent anti-fogging properties. Fogging occurs mainly by condensation of moisture in air in the green house or tunnel to form water droplets on the inner surface of the covering material.

The following methods have been proposed to prevent formation of water droplets on the inner surface (the surface facing the inside of the green house or tunnel) of the covering material.

(1) A method wherein an anti-fogging agent is incorporated in the synthetic resin material, followed by filming (e.g. Japanese Examined Patent Publication No. 6845/1956)

(2) A method in which an anti-fogging agent is coated on the surface of a synthetic resin film (e.g. Japanese Examined Patent Publication No. 31508/1978).

However, by these conventional methods, it is difficult to prevent formation of a mist in the vicinity of the inner surface of the covering material when the temperature difference is substantial between the inside and outside the covering material.

As a method for preventing fogging and formation of a mist in the vicinity of the inner surface of a covering material, a method has been proposed in which an anti-fogging agent and a silicon compound, or an anti-fogging agent and a fluorine-containing compound, are used in combination, as disclosed in Japanese Unexamined Patent Publications No. 12070/1982 and No. 14648/1982.

However, when an anti-fogging agent is used in combination of a silicone compound or a fluorine-containing compounds, the anti-fogging properties may sometimes be impaired. Especially when such a material is used in a summer season or in early autumn where the temperature is high, the deterioration of the anti-fogging properties tends to be facilitated and the durability of the anti-fogging properties tends to be extremely poor.

However, the above-mentioned conventional methods also have the following drawbacks:

① In each case, the additive is incorporated to the base resin to obtain an anti-fogging effect and an effect for preventing a decrease of the light transmittance. However, in order to avoid an undesirable phenomenon, it is necessary to select the type of the additive and to limit the amount of the additive to be incorporated. Such selection of the type of the additive and limitation of the amount of the additive require substantial work.

② Substantial work and a long period of time are required to ascertain the presence or absence of the interaction between the additive which has already been incorporated in the base resin and the additive to be incorporated anew and to ascertain any change in the surface condition of the synthetic resin film where both additives are coexistent.

③ When the film is practically used as a covering material for a green house or tunnel, it is required to be always stable and maintain a satisfactory surface condition within a wide temperature range ranging from a temperature below the freezing point to a temperature of 70° C.

SUMMARY OF THE INVENTION

Under these circumstances, the present inventors have conducted extensive researches with an aim to provide a covering material which is capable of preventing formation of misty water droplets over a long period of time and has excellent durability of anti-fogging effects and which is free from a deterioration in the light transmittance and has a property of effectively preventing diseases of the cultured plants. As a result, they have found it possible to accomplish such an object by presenting a special shape to the surface of a transparent synthetic resin film. The present invention has been accomplished on the basis of this discovery.

The present invention provides an anti fogging film consisting essentially of a thin film of a transparent synthetic resin, which has micro concavities of at most 20 μm in width and at most 10 μm in depth formed over the entire surface of at least one side of the thin film, the total area of the micro concavities being from 20 to 80% of the area of the film surface on which the concavities are formed.

DETAILED DESCRIPTION OF THE PREFERRED EMBODIMENTS

Figure 1:
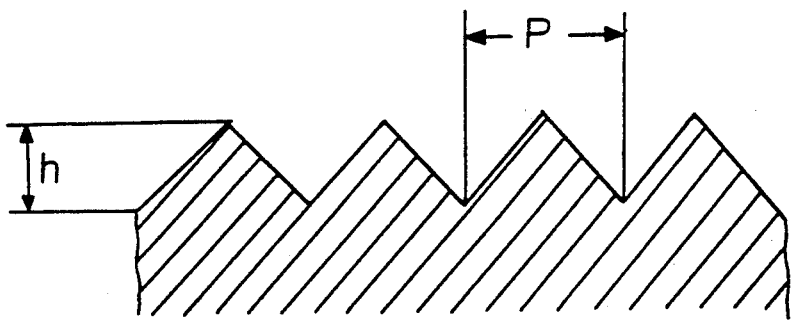
FIG. 1 is a diagrammatical cross-sectional view of an embossing roll used in the Examples, wherein P shows a pitch, and h shows the height of emboss.

In the present invention, the anti-fogging film made of a synthetic resin includes a plate, a sheet and a film made of a synthetic resin. The transparent synthetic resin may be a resin with good transparency, for example, a homopolymer or a copolymer of a monomer such as an olefin such as ethylene, propylene, butene or pentene, a vinyl compound such as vinyl chloride, vinyl acetate, vinyl alcohol, acrylic acid or its derivative, a methacrylic acid or its derivative, styrene or its derivative, or a diene compound such as butadiene or cyclopentadiene; a polyester; a polyamide; a polymer such as polycarbonate or polyimide, or a blend of such polymers.

To prepare a plate, a sheet or a film from such a synthetic resin, a melt-extrusion method, a polymer solution casting method, a calender method or a laminate method may, for example, be employed. Various known resin additives such as a plasticizer, a heat stabilizer, an anti-fogging agent, an anti-mist agent, a lubricant, an ultraviolet absorber, a light stabilizer, an antioxidant, a filler, a dye and a pigment, may be incorporated to the synthetic resin before the resin is formed into a plate, a sheet or a film. The anti-mist agent may be a conventional silicon compound or a fluorine-containing compound. The silicon compound includes silicone oil and an organic siloxane surfactant, and the fluorine-containing compound includes a fluorine surfactant and an oligomer obtained by copolymerizing an unsaturated ester containing a polyfluoroalkyl group with other compound.

The thickness of the film may suitably be determined depending upon the condition for forming the concavities, but is preferably within a range of from 0.02 to 5 mm.

In the present invention, the micro concavities may be formed on the surface of the transparent synthetic resin film, for example, (1) by direct processing with e.g. a laser beam, or (2) by embossing with an emboss roll of a metal mold with an embossing pattern formed by ion beam etching, photoetching (combination of photoresist and etching), photoelectroforming (combination of photoresist and electroforming), or milling.

The concavities on the surface of the synthetic resin anti-fogging film may be in the form of channels or dimples. However, the width of the concavities is required to be at most 20 μm, and the depth of the concavities is required to be at most 10 μm. It is particularly preferred that the width of the concavities is within a range of from 0.2 to 20 μm, and the depth of the concavities is within a range of from 0.02 to 10 μm. More preferably, the depth of the concavities is within a range of from 0.02 to 5 μm. If the width of the concavities exceeds 20 μm or if the depth exceeds 10 μm, the effects for preventing formation of a mist tend to deteriorate.

When the concavities are formed in the form of channels, they may be disposed on the film surface in a parallel, concentric, spiral or lattice pattern. When the concavities are formed in the form of dimples, their shape on the film surface may be circular, oval, triangle or square. The dimples are preferably independent of one another, and they are preferably uniformly distributed. The proportion of the area of the micro concavities is required to be from 20 to 80% of the surface on which the concavities are formed, to attain the water droplet condensing effect. The micro concavities on the surface of the synthetic resin film may be formed on both sides or on one side only of the synthetic resin film depending upon the particular purpose of the film. A film in which the concavities are linear channels formed in parallel to one another, with a transverse cross section of V-shape or U shape, is particularly preferred, since such a film can readily be prepared as compared with films of other types.

A film of the present invention in which the concavities have a width of from 1 to 20 μm and a depth of more than 1 μm and not more than 10 μm, is particularly excellent in the anti-fogging properties. An anti-mist agent such as a silicon compound or a fluorine-containing compound may be incorporated to further improve the effect for preventing formation of a mist.

On the other hand, a film of the present invention in which the concavities have a width of at most 5 μm and a depth of at most 1 μm, is highly effective for preventing formation of a mist, since the concavities are very fine. To improve the anti-fogging properties of this film, an anti-fogging agent may preferably be incorporated. For the film of this type, the width of the concavities is preferably from 0.2 to 5 μm, and the depth of the concavities is preferably from 0.02 to 1 μm. If the width of the concavities is less than 0.2 μm or if the depth is less than 0.02 μm, the fine working of the film on an industrial scale tends to be difficult as compared with the film having the concavities of the above specified sizes. However, the performance may not necessarily be poor.

When the transparent synthetic resin film of the present invention is to be used as a covering material for an agricultural green house or tunnel, it is disposed so that the surface on which the concavities are formed, faces inside. Namely, the prescribed concavities are formed on the inner surface of the covering material, condensation of water droplets is facilitated at the concavities, whereby formation of a mist in the vicinity of the inner surface of the covering material can be prevented. Further, by the presence of the concavities, the durability of the anti-fogging properties is excellent. When the film of the present invention is to be used as an agricultural covering material, it is preferred to employ a base material having an anti-fogging agent incorporated therein.

Further, in order to improve the dust-proof properties of the outer surface of the covering material, it is effective to form a dust-proof coating film by means of a solvent coating material, a water-soluble coating material or an ultraviolet curable coating material.

The film of the present invention may advantageously be used in a case where deposition of water droplets must be avoided or anti-fogging properties are required even in various fields other than the agricultural field. For example, the anti-fogging properties of a glass sheet or a plastic sheet or film may be improved by laminating the film of the present invention thereon. Accordingly, the film of the present invention may advantageously be used for a plate or panel for construction or building where anti-fogging properties are required, or goggles for sport or for other purposes.

Now, the present invention will be described in further detail with reference to the Examples. However, it should be understood that the present invention is by no means restricted to such specific Examples.

EXAMPLES 1 TO 4 AND COMPARATIVE EXAMPLES 1 TO 5

I. Preparation of a Film

| | |
|---|---|
| Polyvinyl chloride (average degree of polymerization: 1300) | 100 parts by weight |
| Di-2-ethylhexyl phthalate | 45 parts by weight |
| Tricresyl phosphate | 5 parts by weight |
| Epoxy stabilier (Epicoat 828, brandname) | 1 part by weight |
| Ba—Zn composite liquid stabilizer | 1 part by weight |
| Barium stearate | 0.2 part by weight |
| Zinc stearate | 0.4 part by weight |
| Ethylene bisstearoamide | 0.3 part by weight |
| Sorbitan monostearate | 2.0 parts by weight |

The above composition was used as the basic composition, and in some cases, an anti-mist agent as identified in Table 1 was incorporated, and the mixture was mixed by a supermixer and then supplied to a calender roll heated to 180° C. to form a film having a thickness of 0.1 mm. A total of nine different types of films were prepared in this manner.

TABLE 1

| | Anti-mist agent (parts by weight) | | Emboss shape of the embossing roll | | Temperature of the film heated by an infrared heater (°C.) | Concavities on the film | | |
|---|---|---|---|---|---|---|---|---|
| | L-7002*1 | Surflon S-145*2 | Pitch (p) (μm) | Height (h) (μm) | | Width (μm) | Depth (μm) | Proportion of the area of the concavities (%) |
| Example 1 | — | — | 20 | 10 | 110 | 16 | 4 | 80 |
| Example 2 | 0.1 | — | 20 | 10 | 110 | 16 | 4 | 80 |
| Example 3 | — | — | 10 | 5 | 110 | 7 | 2 | 70 |
| Example 4 | — | 0.1 | 10 | 5 | 110 | 7 | 2 | 70 |
| Comparative Example 1 | — | — | 100 | 30 | 90 | 25 | 5 | 25 |
| Comparative Example 2 | — | — | 100 | 30 | 110 | 40 | 10 | 40 |
| Comparative Example 3 | 0.6 | — | — | — | — | — | — | — |
| Comparative Example 4 | — | 0.1 | — | — | — | — | — | — |
| Comparative Example 5 | — | — | — | — | — | — | — | — |

*1 Organic siloxane type surfactant, manufactured by Nippon Yunica K.K.
*2 Fluorine-type surfactant, manufactured by Asahi glass Company Ltd.

II. Formation of Concavities

By photoetching (by milling in Comparative Examples 1 and 2), an emboss roll having a diameter of 210 mm and a shape as identified in FIG. 1 with a pitch and a height of emboss as identified in Table 1, was prepared and used as a water-cooled emboss roll.

The film prepared in step I was heated to a temperature as identified in Table 1 by an infrared heater, and the film was passed between the water-cooled emboss roll and a water-cooled rubber roll under a pressure of 0.5 kg/cm to form concavities on one side of the film.

The shape of the concavities on the film was measured by a three-dimensional surface roughness meter (TOPO-3D) manufactured by Matsubo Kiki K. K., and the proportion of the area of the concavities was calculated by a power spectrum. The results are shown in Table 1.

III. Evaluation of the Film

With respect to the nine types of films thus obtained, a mist-formation test and evaluation of anti-fogging properties were conducted in the following manner.

Mist-Formation Test

In a farm in Ichishi-gun, Mie-ken, Japan, nine pipe houses each with a frontage of 5.4 m, a height of 3 m and a length of 15 m were constructed, and a test film was covered on each house so that the side on which the concavities were formed, was located inside of the house (Sep. 29, 1990). Evaluation of the degree of formation of a mist was made during five days (from Oct. 29 to Nov. 2, 1990) upon expiration of one month from the installment of the film on each pipe house, during five days (from Jan. 28 to Feb. 1, 1991) upon expiration of four months and during five days (from Apr. 1 to Apr. 4, 1991) upon expiration of six months.

The numerical values for "evaluation of formation of a mist" have the following meanings.

1: No formation of a mist was observed in the house, or a mist was very slightly observed in the vicinity of the inner surface of the film.

2: A mist was formed throughout the interior of the house, but the end of the house located 15 m away could distinctly be observed.

3: A mist was formed slightly densely throughout the interior of the house, and the end of the house located 15 m away could not clearly be distinguished.

4: A mist was formed densely throughout the interior of the house, and the end of the house located 15 m away was not distinguished at all.

The Table 2 shows an average value of the numerical values during the five days of the observation of the mist-formation.

Evaluation of Anti-Fogging Properties

In a farm in Nagoya-shi, Aichi-ken, Japan, lean-to houses each with a frontage of 2 m, a height of 2 m and a length of 30 m were constructed, and the nine types of the test films were put thereon so that the side on which the concavities were formed, was located inside, on Sep. 14, 1990, and the anti-fogging properties of the respective films were visually periodically observed and evaluated. The results are shown in Table 2.

The numerical values for "evaluation of anti-fogging properties" have the following meanings.

1: Water was deposited in a thin film state, and no water droplet was observed.

2: Water was deposited in a thin film state, but some large waterdrops were observed.

3: Deposition of fine water droplets was partially observed.

4: Deposition of fine water droplets was observed over the entire inner surface of the film.

TABLE 2

| | Evaluation of formation of a mist (the films installed on September 29, 1990) | | | Evaluation of anti-fogging properties (the films installed on September 14, 1990) | | | |
|---|---|---|---|---|---|---|---|
| | Oct, 1990 | Jan, 1991 | Apr, 1991 | Oct, 1990 | Dec, 1990 | Feb, 1991 | Apr, 1991 |
| Example 1 | 1.3 | 1.6 | 1.8 | 1 | 1 | 2 | 2 |
| Example 2 | 1.0 | 1.1 | 1.1 | 1 | 1 | 2 | 2 |
| Example 3 | 1.2 | 1.5 | 1.8 | 1 | 1 | 2 | 2 |
| Example 4 | 1.0 | 1.1 | 1.1 | 1 | 1 | 2 | 2 |
| Comparative Example 1 | 3.0 | 3.0 | 4.0 | 1 | 2 | 2 | 3 |

TABLE 2-continued

|  | Evaluation of formation of a mist (the films installed on September 29, 1990) | | | Evaluation of anti-fogging properties (the films installed on September 14, 1990) | | | |
| --- | --- | --- | --- | --- | --- | --- | --- |
|  | Oct, 1990 | Jan, 1991 | Apr, 1991 | Oct, 1990 | Dec, 1990 | Feb, 1991 | Apr, 1991 |
| Comparative Example 2 | 3.0 | 3.0 | 4.0 | 1 | 2 | 2 | 3 |
| Comparative Example 3 | 1.0 | 1.2 | 1.8 | 1 | 2 | 4 | 4 |
| Comparative Example 4 | 1.5 | 3.0 | 3.5 | 1 | 2 | 2 | 3 |
| Comparative Example 5 | 3.0 | 3.0 | 4.0 | 1 | 2 | 2 | 3 |

EXAMPLE 5

On one side of the same film as used in Example 1, pressing was applied by means of a nickel stamper having parallel protrusions with a width of 3 μm, a height of 1 μm and a pitch of 10 μm formed by photoelectroforming.

Thus, a film having concavities of a channel shape with a width of 3 μm, a depth of 1 μm and a pitch of 10 μm, was obtained. The shapes of the protrusions of the stamper and the concavities of the film were measured by a three-dimensional surface roughness meter (TOPO-3D), manufactured by Matsubo Kiki K. K., and the proportion of the area of the concavities was calculated to be 30% by a power spectrum.

With respect to the film thus obtained, a mist-formation test and evaluation of anti-fogging properties were conducted in the following manner. The results are shown in Table 3.

Mist Formation Test

A test film was put on a frame to form an inclined roof of a mist-observation chamber with four sides defined by wooden plates, so that the side of the film on which the concavities were formed, was located inside, and it was placed over a water tank having water preliminarily adjusted to a temperature of 40° C. and left to stand at room temperature of 25° C. for 24 hours. Then, the room temperature was lowered to 5° C. while maintaining the temperature of the water in the water tank at a level of 40° C., and 30 minutes later and one hour later, the formation of a mist in the vicinity of the inner surface of the film (the surface facing to the water tank) was visually observed.

Further, the room temperature was returned to 25° C., and the assembly was left to stand at a water temperature of 40° C. and room temperature of 25° C. for one week. Then, the room temperature was lowered to 5° C. while maintaining the temperature of the water tank at a level of 40° C., and one hour later, the formation of a mist was visually observed.

Evaluation standards were as follows.
A: No formation of a mist was observed in the vicinity of the inner surface of the film.
B: Formation of a mist was slightly observed in the vicinity of the inner surface of the film.
C: Formation of a mist is observed in the vicinity of the inner surface of the film.
D: Formation of a dense mist was observed in the vicinity of the inner surface of the film.

These evaluation standards correspond to the evaluation standards for the mist-formation test by the pipe houses of Example 1 to 4 as follows: A corresponds to 1, B corresponds to 1 to 2, C corresponds to 2 to 3, and D corresponds to 4.

Evaluation of Anti-Fogging Properties

In a farm in Nagoya-shi, Aichi-ken, Japan, an inclined roof type house with a frontage of 1 m, a height of 2 m and a length of 10 m was constructed, and a test film was covered on this house so that the side on which the concavities were formed, was located inside (Jan. 12, 1990), and the anti-fogging properties of the film were visually observed.

The numerical values for evaluation of the anti-fogging properties have the following meanings.

1: Water was deposited in a thin film state, and no water droplet was observed.

2: Water was deposited in a thin film state, but deposition of large waterdrops was slight.

3: Water was deposited in a thin film state, but deposition of large waterdrops was partially observed.

4: Water did not form a thin film, and fine water droplets were partially observed.

5: Water did not form a thin film, and deposition of fine water droplets was observed over the entire film.

EXAMPLE 6

A film was prepared and tested in the same manner as in Example 5 except that a stamper having parallel protrusions with a width of 1 μm, a height of 0.1 μm and a pitch of 3 μm, was used as the nickel stamper.

With respect to the film thus obtained having concavities of a channel shape with a width of 1 μm, a depth of 0.1 μm and a pitch of 3 μm and a proportion of the area of concavities being 33%, evaluation of the performance of the film was conducted in the same manner as in Example 5, and the results are shown in Table 3.

EXAMPLE 7

A film was prepared and tested in the same manner as in Example 5 except that a stamper having conical protrusions with the bottom diameter of 4 μm and a height of 1 μm at a density of 200 protrusions per 0.1 mm square, as the nickel stamper.

With respect to the film thus obtained having conical concavities with a diameter of 4 μm and a depth of 1 μm and a proportion of the area of the concavities being 25%, evaluation of the performance of the film was conducted in the same manner as in Example 5, and the results are shown in Table 3.

COMPARATIVE EXAMPLE 6

To the film composition of Example 5, an organic siloxane-type surfactant (L-7002, manufactured by Nippon Yunica K. K.) was incorporated in an amount of 0.3 part by weight, and a film having a thickness of 0.1 mm was prepared in the same manner as in Example 5.

With respect to the film thus obtained, evaluation of the performance of the film was conducted in the same manner as in Example 5, and the results are shown in Table 3.

COMPARATIVE EXAMPLE 7

To the film composition of Example 5, a fluorine-containing compound (Surflon S-145, manufactured by Asahi Glass Company Ltd.) was incorporated in an amount of 0.3 part by weight, and a film having a thickness of 0.1 mm was prepared in the same manner as in Example 5.

With respect to the film thus obtained, evaluation of the performance of the film was conducted in the same manner as in Example 5, and the results are shown in Table 3.

COMPARATIVE EXAMPLE 8

In the film composition of Example 5, the amount of bisamide was increased to 0.8 part by weight, and a film having a thickness of 0.1 mm was prepared in the same manner as in Example 5.

With respect to the film thus obtained, evaluation of the performance of the film was conducted in the same manner as in Example 5, and the results are shown in Table 3.

COMPARATIVE EXAMPLE 9

A film having a thickness of 0.1 mm was prepared in the same manner as in Example 5 except that in the film composition of Example 5, no sorbitan monostearate was incorporated.

With respect to the film thus obtained, evaluation of the performance of the film was conducted in the same manner as in Example 5, and the results are shown in Table 3.

TABLE 3

|  | Mist formation test | | | Anti-fogging test | |
| --- | --- | --- | --- | --- | --- |
|  | 30 minutes later | 1 hour later | 1 week later | 2 month later | 6 months later |
| Example 5 | A | A | A | 1 | 2 |
| Example 6 | A | A | A | 1 | 2 |
| Example 7 | A | A | A | 1 | 2 |
| Comparative Example 6 | A | A | B | 4 | 3 |
| Comparative Example 7 | B | B | B | 2 | 3 |
| Comparative Example 8 | B | C | C | 4 | 4 |
| Comparative Example 9 | A | A | A | 5 | 5 |

What is claimed is:

1. An anti-fogging film consisting essentially of a thin film of a transparent synthetic resin, which has micro concavities of at most 20 $\mu$m in width and at most 10 $\mu$m in depth formed over the entire surface of at least one side of the thin film, the total area of the micro concavities being from 20 to 80% of the area of the film surface on which the concavities are formed.

2. The film according to claim 1, wherein the concavities are linear channels formed in parallel to one another.

3. The film according to claim 2, wherein the channels have a transverse cross section of V-shape or U-shape.

4. The film according to claim 1, wherein the thin film has a thickness of from 0.02 to 5 mm.

5. The film according to claim 1, wherein the concavities have a width of from 1 to 20 $\mu$m and a depth of more than 1 $\mu$m and not more than 10 $\mu$m.

6. The film according to claim 1, wherein the concavities have a width of at most 5 $\mu$m and a depth of at most 1 $\mu$m.

7. The film according to claim 6, wherein the concavities have a width of from 0.2 to 5 $\mu$m and a depth of from 0.02 to 1 $\mu$m.

8. An anti-fogging film for covering an agricultural green house or tunnel, consisting essentially of a thin film of a transparent synthetic resin, which has micro concavities of at most 20 $\mu$m in width and at most 10 $\mu$m in depth formed over the entire surface of at least one side of the thin film, the micro concavities being linear channels formed in parallel to one another having a transverse cross section of V-shape or U-shape, the total area of the micro concavities being from 20 to 80% of the area of the film surface on which the concavities are formed, and the film thickness being from 0.02 to 5 mm.

9. The film according to claim 8, wherein the transparent synthetic resin contains an anti-fogging agent.

* * * * *